(12) United States Patent
Essaidi (10) Patent No.: US 11,091,564 B2
(45) Date of Patent: Aug. 17, 2021

(54) METHODS FOR PRODUCING A MANURE-DERIVED BIOPLASTIC AND BIOPRODUCTS

(71) Applicant: Jalila Essaidi, Veldhoven (NL)

(72) Inventor: Jalila Essaidi, Veldhoven (NL)

( * ) Notice: Subject to any disclaimer, the term of this patent is extended or adjusted under 35 U.S.C. 154(b) by 0 days.

(21) Appl. No.: 16/302,924

(22) PCT Filed: May 17, 2017

(86) PCT No.: PCT/NL2017/050308
§ 371 (c)(1),
(2) Date: Nov. 19, 2018

(87) PCT Pub. No.: WO2017/200379
PCT Pub. Date: Nov. 23, 2017

(65) Prior Publication Data
US 2019/0276562 A1 Sep. 12, 2019

(30) Foreign Application Priority Data
May 19, 2016 (NL) ..................................... 2016798

(51) Int. Cl.
*C08B 3/06* (2006.01)
*C08B 16/00* (2006.01)

(52) U.S. Cl.
CPC ............... *C08B 3/06* (2013.01); *C08B 16/00* (2013.01)

(58) Field of Classification Search
CPC .................................. C08B 3/06; C08B 16/00
USPC .......................................................... 536/70
See application file for complete search history.

(56) References Cited

FOREIGN PATENT DOCUMENTS

JP 2002113707 A * 4/2002

OTHER PUBLICATIONS

Yamakawa et al.; JP 2002113707 A; Apr. 16, 2002 (Machine-English Translation).*
Chen et al.; "Value-Added Chemicals from Animal Manure", Value-Added Chemicals from Animal Manure, Dec. 1, 2003.*
Health Building Network (Global Health & Safety Initiative, 2008, 1-6).*
Ashori (Polymer-Plastics Technology and Engineering, vol. 47, No. 8, Jul. 29, 2008 (Jul. 29, 2008), pp. 741-744) (abstract sent).*

* cited by examiner

*Primary Examiner* — Shaojia A Jiang
*Assistant Examiner* — Michael C Henry
(74) *Attorney, Agent, or Firm* — FisherBroyles, LLP (57) ABSTRACT

The invention relates to the separation of manure in fractions and the treatment of said fractions in order to retrieve useful components to produce manure-derived bioplastic and other manure-derived bioproducts. The invention further relates to a method for producing composite (bio)plastic, and to a method for producing fibre from regenerated manure-derived cellulose. The methods include the steps of: flocculation treatment and a filtration treatment; pulping the manure-derived solid fractions; acetylation of the manure-derived dissolving-grade cellulose pulp with acetic anhydride and a catalyst; extracting fermentable components from the different fractions of the manure to produce monocarboxylic acids for use in the monocarboxylic acid carrier solution. Furthermore methods are disclosed for forming composite bioplastics with resin binding agents; and for spinning yarn from cellulose pulp.

18 Claims, 2 Drawing Sheets

FIGURE 1

FIGURE 2

METHODS FOR PRODUCING A MANURE-DERIVED BIOPLASTIC AND BIOPRODUCTS

FIELD OF THE INVENTION

This invention relates to the separation of manure in fractions and the treatment of said fractions in order to retrieve useful components to produce manure-derived bioplastic and other manure-derived bioproducts.

The invention further relates to a method for producing composite (bio)plastic, and a method for producing fibre from regenerated manure-derived cellulose.

BACKGROUND OF THE INVENTION

The current materials used by the make-industry are dominated by the use of unsustainable petrochemical based resources. There is an emergent trend of using renewable bio-based materials instead of their petrochemical alternatives. These renewable materials, often used in the pulping and bioplastic industry, rely for example mainly on harvesting trees from natural forests or other sources specifically cultivated for this purpose only. However, it is more desirable to use an already available waste stream for renewable bio-based materials for the manufacturing industry.

One of the biggest available waste streams is manure. In contemporary agriculture manure is becoming increasingly problematic. Manure proves to be difficult to process as a fertiliser because of the large volumes that need to be transported, the limited control of nutrient balance and problems with solid particles in irrigation systems. In areas where livestock is intensively farmed this has led to a large excess of manure. Complications arise for livestock farmers because of problems with unpleasant odours, health issues, large-scale eutrophication, extra regulations and extra costs to discard the manure. In an increasing number of countries legislation is focused on limiting the amount of nitrogen or phosphorus used on their own pastures, while surplus manure needs to be disposed of. Since the composition of solid and liquid fractions of manure differ in nutrient composition, it can be favourable for the farmer to separate fractions and remove the most undesired fraction of manure. Although this excess manure is currently problematic it has high potential for refining into value added products such as protein, fibrous material, carbohydrates and nutrients.

The current separation methods aim to optimise the solid fraction of manure for use as bedding for livestock, biochar, fertilizer and as a source for biogas fermentation processes. However, these materials are of an entirely different class when compared to materials such as bioplastics, which are useful for the manufacturing industry. Adjustments of the current separation methods are desirable in order to obtain a solid fraction more suitable as a feedstock for bioplastics.

In terms of previous known information closest to actually producing bioplastic from manure is the method of US. Pat. No. 2013/0071890 A1, which discloses the production of bioplastic from biogas in a fermenter with aerobic methanotrophic bacteria capable of biopolymer production and a secondary fermenter in which bioplastic production is induced in the presence of methane. However, these findings use the available lignocellulose as an indirect source for bioplastic.

A direct use of the available lignocellulose in manure as source or filler for bioplastic would be more desirable. While methods for directly processing the lignocellulosic biomass in manure to produce end products such as crystalline cellulose have been developed, for example WO. Pat. No. 2015/101941 A1, none have been developed for end products such as bioplastic. Also, these methods are carried out high above atmospheric pressure and at high temperatures which makes these methods unnecessarily dangerous.

These existing methods also involve processing the entire waste stream, yet treating the entire quantity of manure in a reactor prior to separation is not an economically viable process; especially with respect to the relatively low price of cellulose itself. In order to improve on these methods, it is desirable to reduce the total volume of manure and obtain an increased ratio of cellulose, by separating different components of manure into different sidestreams, prior to treatment.

Existing traditional methods for processing non-manure based lignocellulosic biomasses in the pulping and bioplastic industry almost exclusively utilize wood and grasses, for example WO. Pat. No. 2014/122533 A2. These methods are specialised for these sources and would need specific adjustments while using manure as the source of the lignocellulose, partly due to the digestive processes that already took place in the cow's digestive system, but mostly because manure can be considered more chemically heterogeneous than more conventional lignocellulosic biomass sources. For example, manure contains more protein which can increase the use of certain process chemicals and hinder effectiveness of treatments while proteins can also be used as a valuable product. This emphasises the need for extra separation treatments in processing manure. Although there are methods developed to optimise extraction of cellulosic material from manure, most methods focus on hydrolysing polysaccharides to short-chain sugars for fermentation. Therefore, treatments used in these methods can be too aggressive and damage the integrity of the cellulosic fibres. A method which uses less hazardous chemicals, that allows for a better recovery of the sidestreams and a better recovery of process chemicals, would be desirable.

Traditional pulping methods such as the Kraft process or bisulfite pulping and chlorine-based bleaching notoriously have a large impact on the environment due the large amount of aggressive chemicals and energy required. Organosolv pulping techniques for example WO. Pat. No. 2011/126369 A1 use organic solvents for the extraction of lignin and hemicellulose. These methods have offered promising environmentally friendly alternatives because of the more environmentally friendly nature of the solvents, the high retrievability of solvents and higher quality of lignin side products. Though, many of these processes are still performed at high temperatures and pressures which are demanding in terms of energy requirements, safety and equipment costs. Another advantage of organosolv techniques over the Kraft method is that the techniques are more gentle for the cellulosic fibres, which is more suited for cellulosic fibres in manure. However, no organosolv pulping method has been developed for the specific source of lignocellulosic biomass in manure.

It is desirable to use the lower quality manure-derived cellulosic fibres and other manure-derived chemicals, which are not suitable for production of manure-derived bioplastic, to produce other manure-derived bio-products like paper, cardboard, medium and low density fibreboard, fertiliser.

Thus, there remains a considerable need for methods that can treat manure to optimise separation into a solid and liquid fraction; use the available lignocellulose as a direct source or filler for bioplastic; do this at atmospheric pressure; only treat that portion of the waste stream that contains the lignocellulose; separate interfering compounds from the manure prior to treatment that can be used as products themselves; and utilise useful components in manure to directly convert the cellulose present in manure to cellulose derived bioplastic and other bio-products.

SUMMARY OF THE INVENTION

The present invention is directed to methods for safely producing environmentally friendly manure-derived bioplastics, having manure and manure extracted components as their direct feedstock.

Among the many different possibilities contemplated, the produced bioplastics may be directly derived from the manure-derived solid fraction with high lignocellulose content that is delignified, bleached and/or acetylated, under atmospheric pressure, in the presence of an acetylation catalyst, resulting in either cellulose based esters or cellulose based ethers. These treatment processes may include fermentable products derived from manure or sidestreams of this method, including (poly)saccharides or amino acids that can be used to produce monocarboxylic acids or the precursor of said desired monocarboxylic acids, which may form the main liquid carrier throughout the pulping and acetylation process(es).

Prior to these processes the manure may be treated to change the composition of the solid or the liquid fractions desired at the different stages of the process, in order to: obtain different grades of manure-derived lignocellulose; avoid having to treat the entire quantity of manure; extract fermentable components from the different fractions of the manure; let the livestock farmer decide if the manure obtained from the agricultural operation is either high or low in nutrients.

In preferred embodiments the concentration of the different acids, the temperature, the pressure and the acetylation catalysts may be tuned to obtain a desired treatment, and be adjusted during the processes. In some embodiments the delignification, bleaching and acetylation steps may be either combined or are consecutively. In some embodiments the spent monocarboxylic acids are retrieved by distillation. In some embodiments organic acid anhydride may be added for acetylation or to decrease the water content of the main liquid carrier. In some embodiments the cellulose pulp may be subjected to a base/alkaline extraction treatment. In some embodiments the manure-derived solid fraction with high lignocellulose content and the other fractions of manure that are not suitable for manure-derived bioplastic production may be used to produce other manure-derived products.

In some embodiments the produced bioplastics may be formed by directly combining the manure-derived solid fraction of high lignocellulosic content with a resin or polymer binding agent to form a composite (bio)plastic.

Various objects, features, aspects, and advantages of the present invention will become more apparent from the following detailed description of preferred embodiments of the invention, along with the accompanying drawings in which like numerals represent like components.

DESCRIPTION

Figure 1:
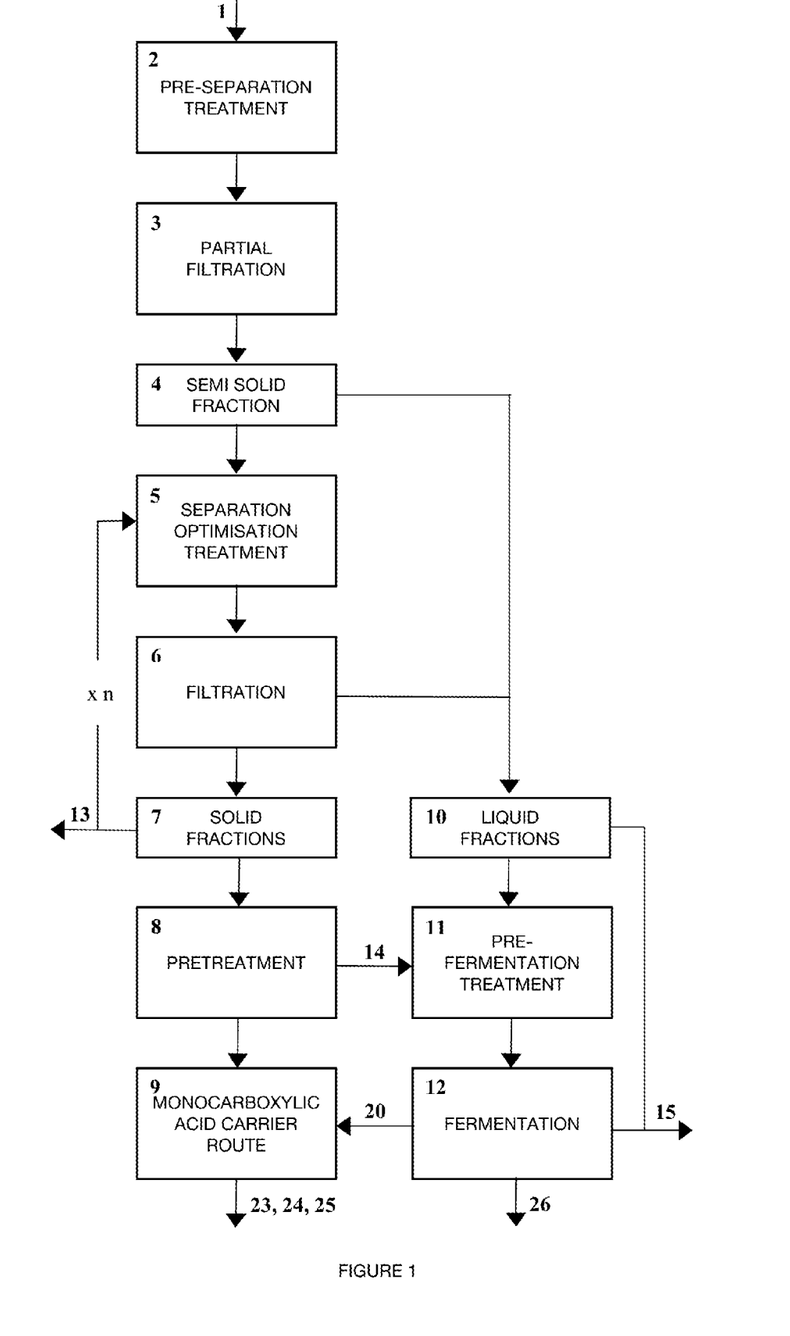
FIG. 1 shows the general steps in one example embodiment of a method for directly producing a manure-derived cellulose acetate at atmospheric pressure.

FIG. 1 generally depicts an example embodiment of a process for producing cellulose acetate 24 having manure 1 and manure extracted components as its direct feedstock, which includes a pre-separation treatment step 2, a partial filtration step 3, a separation optimisation treatment step 5, a filtration step 6, a pre-treatment step 8 and the monocarboxylic acid carrier route step 9. In some embodiments, the monocarboxylic acids 22 for the monocarboxylic acid carrier route step 9 are produced after a pre-fermentation treatment step 11 and a fermentation step 12. In some embodiments this method will involve a net production of different grades of cellulose products 23, fertilizer 15 and fermentation products 26 like monocarboxylic acids.

The manure 1, as used herein, includes faeces or urine from dairy cattle. The manure can vary in composition due to different animals, different diet of animals, seasonal changes, difference in collecting and storage conditions, bedding material and mixing with other lignocellulosic waste streams. In some embodiments the manure includes faeces or urine from other animals (including humans) and can also include materials where it is mixed with during processing at an agricultural operation such as bedding material, paper, straw, grasses, wood chips, sawdust, hemp fibre or the like. Therefore, further processing is tuned to optimise treatments for variations in manure.

Manure obtained from an agricultural operation or still present at such operation is treated in a pre-separation treatment 2. When an agricultural livestock operation uses the liquid fraction of manure to fertilise its own pastures it can exceed legal limits on certain nutrients. An aspect of the invention is that an agricultural livestock operation can, through a pre-separation treatment 2, separate undesired parts (e.g. phosphates, nitrogen) to be processed by the invention, and thus decide if the manure obtained from his agricultural operation is either high or low in nutrients. In some embodiments a flocculant such as iron(iii)chloride ($FeCl_3$) or alum ($Al_2(SO_4)_3$) is mixed with the liquid fraction of manure, where after coagulation or flocculation of suspended particles takes place. After sedimentation a significant amount of nutrients especially in the form of phosphates or nitrogen are found in the sediment. By using the pre-separation treatment 2 on manure an agricultural livestock operation gains control over the separation of desired and undesired components of manure.

In some embodiments, manure 1 or pre-separation treated manure 2 is obtained in any appropriate manner that allows, through partial filtration 3, for the removal of the greater part of the liquid fraction of manure, for example by using a screw press. In some embodiments this partial filtration is performed at the agricultural operation, this ensures that the farmer retains a liquid fraction of manure that is better suited to use as fertilizer. Partial filtration at the agricultural operation also reduces the total mass that is to be transported to the processing plant. Most importantly, partial filtration reduces the to-be-treated total quantity of manure to only the necessary fractions of manure that have high lignocellulose content, which makes this process more economically viable compared to methods that process the entire waste stream like WO. Pat. No. 2015/101941 A1.

In some embodiments, the direct result of the partial filtration step 3 is a semi solid fraction 4 of manure that is to be separated into solid fractions of high lignocellulose content during the separation optimisation treatment 5 and filtration 6 steps. In some embodiments other compounds such as proteins, minerals, lipids, mono saccharides and oligosaccharides are also separated during these steps.

Since manure is considered more chemically heterogeneous than other lignocellulose sources, separation into various fractions will improve further treatments while obtaining useful sideproducts. The purpose of the separation optimisation treatment is to optimise the separation of manure into multiple fractions by "translocating" the chemical of choice to a desired state (e.g. foam, dissolved in liquid, solid particle), by treatment with heat, a chelating agent, a detergent, a flocculant, a foaming agent, enzymes, a organic solvent an acid or base. In some embodiments a foaming agent is added to the (semi)solid fraction of manure in the form of sodium chloride and ammonium sulfate (($NH_4)_2SO_4$) subsequently the manure is agitated until a foam forms. The foam consists mostly of protein and other substances interfering with lignocellulose treatments. The foam fraction is removed from the top layer of liquid (and used for further refinement). In some embodiments a chelating agent is used in order to remove metal ions that may interfere with further pulping processes or are desired in the liquid fraction. Chelating agents can include citric acid and ethylenediaminetetraacetic acid (EDTA). In some embodiments a detergent is added to separate polar from non-polar substances and thereby wash the lignocellulose fibres from lipids and undesirable components. In addition, a detergent is added to increase foaming action. In some embodiments an organic solvent is used to remove lipids, oils and other soluble compounds from the solid fraction. The organic solvent includes ethanol, methanol, acetone, isopropanol, hexane or toluene and is preferably performed at high temperature. After extraction with the organic solvent the solvent is retrieved by (vacuum)distillation.

The use of a semi solid fraction 4 during the separation optimisation treatment 5 allows for the minimizing of spent water. In some embodiments, the semi solid fraction is either filtrated or diluted through addition of water to obtain a desired ratio for the separation optimisation treatment. In some embodiments, separated liquid from previous partial filtration 3 or filtration 6 steps is used to dilute the semi solid fraction.

The fraction of manure obtained after the separation optimisation treatment 5 is separated in solid 7 and liquid fractions 10 during the filtration 6 step, for example by using a filter screw press or by centrifugal separation. After which, the solid fraction is filtered by sieving, to separate fractions on particle size using different mesh sizes. The more intact lignocellulose fibers, found in large particle fractions, are separated from the more degraded compounds found in smaller particle fractions 13 to separate solid fractions 7 with high lignocellulose content. For the large particle fractions a mesh size in the range of 1-3 mm is used, for the smaller particle fractions a mesh size in the range of 0.05-1 mm is used. In some embodiments the mesh size is depending upon the nature of the manure and mixed lignocellulose sources and the upper limit can be up to 2-10 cm. In some embodiments multiple sieves are used in order to enhance the effectiveness of filtration and reducing clogging of filters.

The separation optimisation 5 and filtration 6 steps are performed multiple times with different or similar process conditions, resulting in different solid fraction's 7 with different purposes, and different liquid fractions 10. The separation optimisation treatment combines different treatments in a single step due to the complementary effect of the components. In some embodiments a foaming agent, detergent, chelating agent and acid are used as a first stage treatment where after the solid fraction is then treated with a 70% aqueous ethanol solution at a temperature of 50-60° C.

Depending on the nature of the pulp the large particulate solid fraction 7 of high lignocellulose content is then pretreated 8 to extract hemicelluloses. In some embodiments that pretreatment consists of base/alkaline extraction with sodium hydroxide 1-10% at a temperature of 30-95° C. Depending on the nature of the pulp hydrogen peroxide can be added in concentrations of 0-5%. In addition this step also includes partial delignification of the lignocellulose and activation of the cellulose in order to enhance the accessibility and reactivity of cellulose to chemicals in the monocarboxylic acid carrier route 9. In one aspect of the invention the hemicellulose extraction is performed after the bleaching step using a cold caustic extraction with sodium hydroxide 1-10% at a low temperature range 20-40° C. In some embodiments the hemicellulose 14 is extracted for use in fermentation 12.

Figure 2:
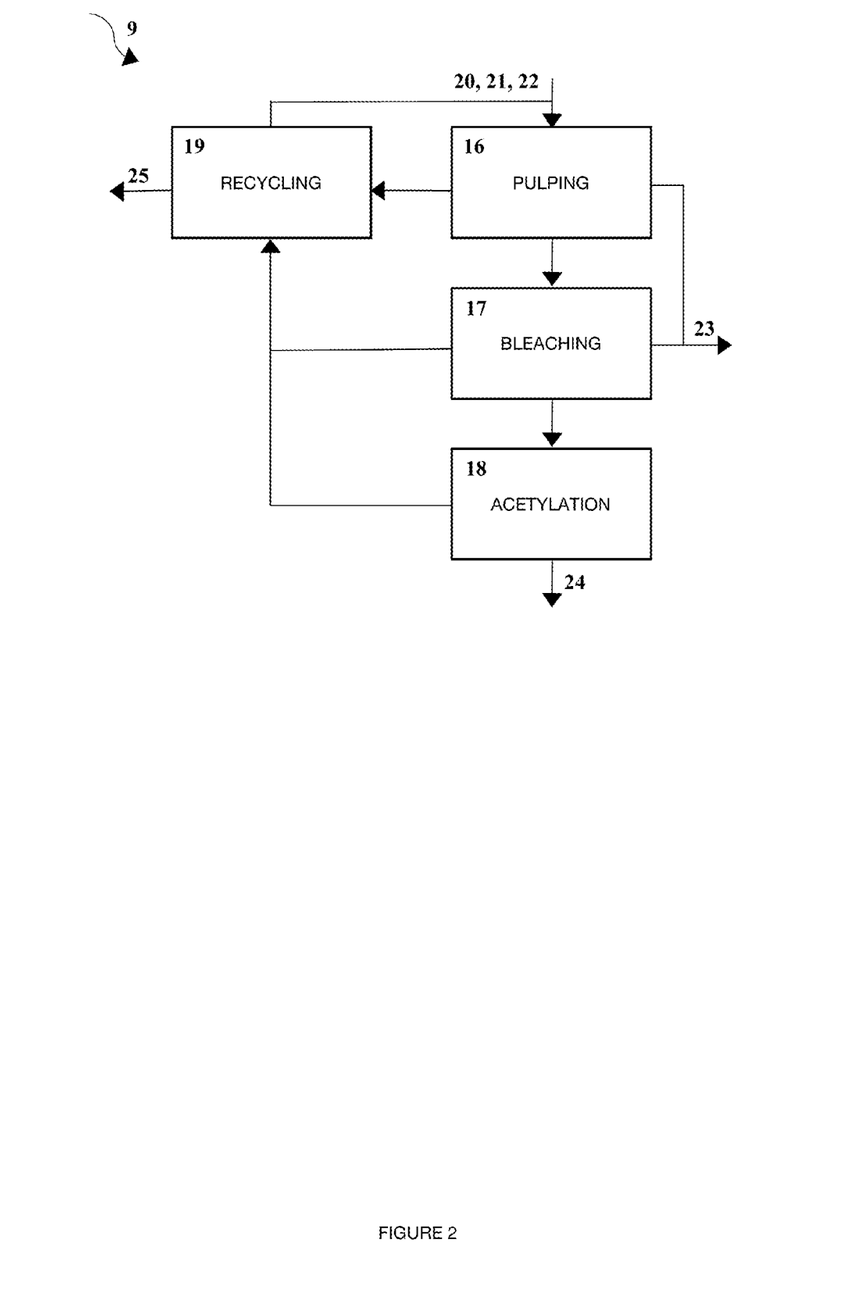
FIG. 2 shows the more detailed steps of the monocarboxylic acid carrier route in one example embodiment of a method for directly producing a manure-derived cellulose acetate at atmospheric pressure.

FIG. 2 generally depicts an example embodiment of the more detailed steps of the monocarboxylic acid carrier route 9, having pre-treated solid fraction of high lignocellulose content 21 as its direct feedstock, which includes a pulping step 16, a bleaching step 17, an acytelation 18 step and an recycling step 19.

After the pretreatment, the solid fractions of high lignocellulose content 21 are treated in a monocarboxylic acid carrier route 9. Here the manure-derived solid fraction of high lignocellulosic content is pulped 16 at atmospheric pressure with a acetic acid carrier solution in a concentration of 70-90% and a sodium bisulfate ($NaHSO_4$) catalyst in a concentration of 0-5%. In some embodiments, the monocarboxylic acid is acetic acid, formic acid, propionic acid, butyric acid or are a combination thereof in a concentration of 10-100%, preferably above 50%. In some embodiments the catalyst is nitric acid ($HNO_3$), sulfuric acid ($H_2SO_4$) or hydrochloric acid (HCl) in concentrations of 0-10%, the concentration and type of catalyst is chosen depending on the nature of the pulp. Some pulps require a mild carrier to avoid further cellulose degradation.

Afterwards a bleaching 17 process comprising of ozone at 20-40° C. and peracetic acid treatment at 50-80° C. in the monocarboxylic acid carrier is used to produce a dissolving-grade cellulose pulp. Concentration and duration of the treatments vary depending of the nature of the pulp. In some embodiments, the bleaching agent is a peracid (peroxy acid), ozone, oxygen, hydrogen peroxide or a combination thereof.

In some embodiments this cellulose pulp is used to create different grades of cellulose products 23 consisting of paper, cardboard, regenerated fibre, pulp in various grades of refinement.

After the bleaching 17 step an acetylation 18 process is used to acetylate the manure-derived dissolving-grade cellulose pulp with acetic anhydrid in the monocarboxylic acid carrier solution with a concentration of 100%, with sodium bisulfate ($NaHSO_4$) as a catalyst to produce cellulose acetate 24. In some embodiments the catalyst added is sulfuric acid ($H_2SO_4$), sodium bisulfate ($NaHSO_4$) or a combination thereof. The hydroxylgroups of the cellulose are substituted with acetate groups directly until the desired degree of substitution or indirectly. Depending on the nature of the pulp, especially the degree of polymerisation, the cellulose can be acetylated directly to reach the desired degree of substitution to prevent cleaving of the cellulose polymers by hydrolysis. Alternatively, if the degree of polymerisation is high enough the cellulose is first fully substituted to cellulose triacetate (CTA) whereafter CTA is hydrolysed until the desired degree of substitution is reached.

In some embodiments the manure derived cellulose bioplastic consists of cellulose acetate butyrate, cellulose acetate propionate, or other cellulose derived esters. In a particular embodiment the manure derived cellulose bioplastic consist of carboxymethyl cellulose or other cellulose derived ethers.

All three of these processes can use the same monocarboxylic acid solution in different concentrations as main carrier for the delignification, bleaching and acetylation processes, in which the solid fractions of high lignocellulose content are consecutively delignified, bleached and acetylated at atmospheric pressure and a temperature of 80-130° C. In an aspect of the invention the boiling point of the monocarboxylic acid carrier is elevated by adding carboxylic acids with a higher molecular mass. The use of the monocarboxylic acid carrier solution makes countercurrent washing possible. In some embodiments these processes can take place combined to minimise spent chemicals and energy. Hereby stages in the process can be initiated by addition of chemicals and changes in temperature or the processes can be performed in a single batch whereafter separation of undesired products can be performed after acetylation. In some embodiments these processes take place at a pressure of 0-10 bar and a temperature of 50-180° C. In some embodiments organic acid anhydride, in particularly acetic anhydride is not only added to acetylate the manure-derived dissolving-grade cellulose pulping product but also used to decrease the water content of the monocarboxylic acid carrier solution. In some embodiments multiple chemicals are used for the monocarboxylic acid carrier solution for the different processes.

The monocarboxylic acids of the monocarboxylic acid carrier solution are partially or fully retrieved from the spent monocarboxylic acid carrier solution by distillation at low to atmospheric pressure to recycle 19 the monocarboxylic acids. The solid fraction that remains after distillation of the spend monocarboxylic acid carrier solution 25 consists mainly of a high quality lignin and hemicellulose. In some embodiments the lignin is used as a product after hemicellulose is extracted from the solid material and used for fermentation.

In some embodiments the monocarboxylic acid carrier is partly or fully claimed from fermentation products 20 derived from the liquid fractions 10, smaller particle fractions 13, hemicellulose 14 of this method, including (poly) saccharides or amino acids. In some embodiments, the fermentation products are the precursor of said desired monocarboxylic acids. In some embodiments, the fermentation products are butanoic acid, propanoic acid, acetic acid, formic acid. In some embodiments, the fermentation products are ethanol, methanol, propanol, butanol or other fermentation products 26.

Prior to fermentation 12 the fermentable products are pre-treated 11 in order to prepare the fermentable products for optimal fermentation conditions. In some embodiments the side streams from the invention are selected and mixed to achieve optimal conditions for fermentation. The liquid fractions have different compositions depending on their origins, which consist either of the partial filtration step 3, or the multiple filtration steps from the separation optimisation- and filtration cycle. Depending upon the concentration of fermentable compounds and nutrients a liquid fraction can be concentrated by reverse osmosis or diluted by mixing with side streams with lower concentration. The small particle solid fraction 13 and low grade cellulose pulp can be hydrolysed to obtain fermentable compounds such as monosaccharides, oligosaccharides and amino acids. In some embodiments nutrients and non-manure derived fermentable compounds can be added to the increase yield of fermentation.

Acetic acid for the monocarboxylic acid carrier solution is produced by fermentation of the product of the pre-fermentation treatment 11 to ethanol whereafter the solution is subsequently metabolised to acetic acid in a second fermentation process. In some embodiments other monocarboxylic acids are produced by changing composition of the fermentable compounds in the pre-fermentation treatment and using organisms with different metabolic pathways. Another aspect of the invention is using mixed acid fermentation where multiple useful products are produced in a single fermentation process.

In some embodiments the solid digestion residue with a high degree of bacterial cellulose produced by fermentation is used for the production of cellulose derived bioplastics.

The liquid fractions originating from the fermentation treatment are combined to produce a fertiliser product 15 that can be used for agricultural, horticultural and consumer purposes. By combining liquid fractions 10 and liquid fermentation residue, nutrients from manure can be retrieved after concentration with reverse osmosis. In some embodiments further concentrating the nutrient solution is achieved by evaporation of the solution to a fertiliser product that consists of a solid dried granular or powder product obtained by spray drying. In a particular embodiment the fertiliser product consists of a highly concentrated nutrient solution. In a preferred embodiment liquid fractions from the fermentation treatment are distilled at low or atmosphere pressure to obtain monocarboxylic acids while simultaneously the remaining solid particles are used to obtain nutrients for the fertiliser product. In some embodiments the fertiliser product is balanced to a desirable nutrient composition (e.g. N-P-K) by careful selection of process chemicals in previous steps. When it is desirable to increase the nitrogen composition of the fertiliser ammonium hydroxide ($NH_4OH$) is be used as a base in the separation optimisation treatment. When it is desirable to increase potassium composition of the fertiliser potassium hydroxide (KOH) is used. When it is desirable to increase phosphor composition of the fertiliser phosphoric acid ($H_3PO_4$) is used. In some embodiments the fertiliser product is rich in organic substances such as humic acid. In some embodiments nitrogen and phosphorus nutrients can be obtained from the liquid fractions by struvite precipitation to produce the fertiliser product or a component of the fertiliser product.

EXAMPLES

In the specific examples below different steps of the method are described as indicated previously, which are intended to be illustrative and not limiting in nature.

Example 1: Pretreatment

For the extraction of cellulose, a pretreatment was performed. The washed solids consist of light brownish fibrous materials with most fibres smaller than 2 cm. Four samples of 50 g of oven dried solid fraction were mixed with 500 ml of solution with different sodium hydroxide (NaOH) concentrations, namely 2.5, 5, 7.5 and 10% w/v sodium hydroxide (NaOH) and 1% hydrogen peroxide ($H_2O_2$) w/v. The suspension was kept for one hour at 90° C. at atmospheric pressure. After the treatment the liquid filtrate was dark brown. The fibrous solid material washed with water to neutrality. The colour of the fibre samples was light brown.

The pretreated samples were then delignified with a monocarboxylic acid carrier treatment and equal conditions to obtain a cellulose pulp. The pulp was then characterised by measuring alpha-cellulose content, brightness, Kappa number of the pulp and degree of polymerisation.

Example 2: Separation Optimisation Treatment

The separation optimisation treatment was performed on the semi solid fraction. To induce foaming 0.2% of sodium chloride and of 0.5% ammonium sulfate (($NH_4$)$_2SO_4$) and optionally ferric chloride ($FeCl_3$) was added as flocculant. 0.5% of sodiumlaurylsulfate (SLS) was added as a detergent and to increase the effect of foaming. To increase effectiveness of the detergent and to remove metals that interfere with further processes a chelation agent was added in the form of 0.3% EDTA. The pH value of the solution was brought to 8 by using an acid or base depending on the nature of the manure. The manure solution was heavily agitated by using a strong pump to induce foam formation. The foam was mechanically removed several times until little to no foam was formed. The collected foam was liquefied and dried.

The remaining solution was filtered with 5 sieves with a maximum mesh size of 1.8 mm to a minimum mesh size of 0.05 mm. The use of multiple sieves with a mesh size smaller than 1.8 mm is to prevent clogging of the subsequent sieves. Solid fractions collected from the sieves with a mesh size smaller than the sieve with the maximum mesh size of 1.8 mm were combined and were regarded as the small particle solid fraction with a higher protein content. Solid particles collected by the sieve with largest mesh size are the solid fraction with high lignocellulose content.

The solid fraction with high lignocellulose content was washed and filtered subsequently with water of 70° C. After this step the solid fraction was subjected to a methanol washing stage where fibres were soaked in a 70% aqueous methanol solution at 60° C. After soaking the solid fraction was filtered and washed with water.

The remaining solid fraction was characterised as consisting of light brown fibrous material with a high lignocellulose content and low concentration of protein and lipids.

Example 3: Monocarboxylic Acid Carrier Route

Pretreated fibres from the solid fraction are dried until fibre mass with low moisture content is obtained. 100 g of the pretreated solid fraction was then treated with a monocarboxylic acid carrier solution consisting of: 1L of a 80% aqueous acetic acid solution and 2% nitric acid. The fibres were suspended and heated to boiling temperature at atmosphere pressure in a reflux apparatus. After reaching boiling temperature the fibres were treated for 1.5 hours.

The pulped fibres were washed with 80% aqueous acetic acid to remove the nitric acid components and dissolved lignin. Then the pulped fibres were subjected twice to a ozone bleaching treatment with a liquid to pulp ratio of 1:2 at 30° C. Duration of the bleaching treatment depended upon the nature of the pulp. After washing with 80% aqueous acetic acid the pulping solution was then brought to 70° C. for peracetic acid bleaching. (A temperature more preferable for peracetic acid formation equilibrium.) Depending on the nature of the pulp, an amount of peracetic acid is added for a certain amount of time. After the peracetic acid bleaching of 4 hours the solution was filtrated. The solid fibres were washed two times with a 80% aqueous acetic acid solution. the pulp was then mixed in a saturated solution of sodium sulfite ($NaSO_3$) in a 80% aqueous acetic acid solution and left for 30 minutes to remove oxidizing agents. After filtration the fibres were washed twice with glacial (100%) acetic acid. One half of the fibres were used for acetylation while the other half was used for analysis on pulp quality such as brightness, alpha-cellulose content and the kappa number of pulp.

To preserve the integrity of the cellulose polymer, bleached fibres were subjected to a mild acetylation process. The whole acetylation process was performed at room temperature using a mild catalyst. The fibres were now put into a beaker glass with 200 ml of glacial (100%) acetic acid and 0.15 ml of sulfuric acid ($H_2SO_4$) (98%). 0.3 g sodium bisulfate ($NaHSO_4$) were added as mild catalyst. The solution was agitated with a stirrer set at 150 rpm. 60 ml of acetic anhydrid was slowly added over the course of 30 minutes. The acetylation process lasted until the desired degree of polymerisation was obtained (e.g. cellulose diacetate (CDA) with a degree of substitution of 2.4). The catalysts were neutralised by adding sodium acetate whereafter the solution was poured into a bath of distilled water in order to precipitate the cellulose acetate. The formed solids were now washed until neutral and dried until cellulose acetate products was obtained.

The cellulose acetate product was dissolved in acetone and undissolved particles separated from the solution by ultracentrifugation. The degree of polymerisation and thermal degradation was determined.

The cellulose diacetate (CDA) dissolved in acetone was concentrated until a spinning dope solution of the desirable viscosity was reached. The spinning dope was then dry spun to obtain cellulose acetate tow.

Example 4: Acetic Acid Carrier Route for Cellulose

After the separation optimisation treatment, the solid fraction was pretreated with a solution of 5% sodium hydroxide and 1% hydrogen peroxide with a liquor to biomass ratio of 4:1 this was mixed thoroughly and kept at 70° C. for one hour. After the treatment fibres were washed until neutral and dried.

100 g of pretreated fibres from the solid fraction were treated with a monocarboxylic acid carrier solution consisting of 1L of an 80% aqueous acetic acid solution and 0.5% aqueous nitric acid solution. The fibres were suspended and heated to boiling temperature at atmosphere pressure in a reflux apparatus. After reaching boiling temperature the fibres were treated for 1 hour. After the treatment fibres were filtered and washed with 100 ml 90% acetic acid.

Fibres were then mixed with 250 ml of a 90% aqueous acetic acid solution. Sulfuric acid was added as a catalyst until a concentration of 0.3% was reached. The mixture was kept at boiling temperature for 1 hour. Depending on the nature of the pulp. After treatment 4 g sodium acetate dissolved in 30 ml 80% aqueous acetic acid solution was added to neutralise the sulfuric acid catalyst. Lignin content and kappa number were analysed to estimate reaction time needed for bleaching.

The pulping solution was then brought to 70° C. for peracetic acid bleaching. (A temperature more preferable for peracetic acid formation equilibrium.) Depending on the nature of the pulp an amount of hydrogen peroxide is added for a certain amount of time. 100 ml of a 35% aqueous hydrogen peroxide solution was added for peracetic acid formation. After the peracetic acid bleaching of 2 hours the solution was filtrated. The solid fibres were washed with distilled water until neutral. Finally, a cold caustic extraction was performed to increase alpha cellulose content by removing residual hemicelluloses. The fibres were subjected to a solution of 8% sodium hydroxide (NaOH) under stirring at 30° C. for ten minutes. The fibres where then washed until neutral and dried. Alpha cellulose, kappa number and iso brightness were determined. A highly refined cellulose product was obtained.

Example 5: Mixed Monocarboxylic Acid Carrier

Since pulping with a higher temperature can be more effective or time saving, it is beneficial to increase the boiling temperature of the carboxylic acid carrier liquid. In order to increase the boiling temperature while still under atmospheric pressure a monocarboxylic acid with higher boiling point was added. However, using longer chained monocarboxylic acids might decrease effectivity of the process because of fewer active groups per volume of the liquid carrier.

Butyric acid was added in various concentrations to a concentration of 90% aqueous acetic acid and boiling point was measured hereafter. 0, 5, 10, 15, 20, 30, and 40 ml of a pure butyric acid solution were added to a beakerglass, then the beaker was filled to a total of 100 ml with a 90% aqueous acetic acid solution. 20 ml of 70% nitric acid was added to each solution. Boiling temperature was determined using 10 ml of the mixture in a test-tube with a thermometer submerged in the liquid while the test-tube was being heated in a warm bath. When bubbles reached the surface the temperature was seen as boiling temperature.

10 g of dried and pretreated fibres from the solid fraction were mixed with each of the solutions and 0.3% sodium bisulfate ($NaHSO_4$) and heated until boiling point and kept at this temperature for 0.5 hours. Pulped fibres were bleached simultaneously with ozone and peracetic acid at 40° C. for 3 hours. Fibres were separated and washed thoroughly finally alpha-cellulose content, kappa number, brightness and lignin content were determined.

Example 6: Acetic Acid Ozone+Peracetic Acid Route 100 g of fibres from the solid fraction were treated with a monocarboxylic acid carrier solution consisting of 1L of an aqueous solution of 70% acetic acid 20% formic acid and 0.7% nitric acid and 0.2% sodium bisulfate ($NaHSO_4$). The fibres were suspended and heated to boiling temperature at atmosphere pressure in a reflux apparatus. Only after reaching boiling temperature the catalysts were added and were treated for 2.5 hours. After the treatment fibres were filtered and washed with 100 ml 90% acetic acid. The fibres were then suspended in 200 mL of 70% acetic acid and 10% formic acid and were treated with ozone at 30° C. until a total of 4.5 g ozone was reached. Subsequently the sample was bleached with 12% peracetic acid based on pulp. Peracetic acid bleaching was done at 70° C. for a total of 4 hours. Kappa number and ISO brightness were measured.

Example 7: Liquid Fraction Fermentation

A spent monocarboxylic acid carrier solution consisting of 80% acetic acid and 3% nitric acid that has been used for delignification of the solid fraction was recycled while useful components were extracted. 1L of solution was put into a distillation apparatus and fully distilled. The distilled liquids were collected and could be reused for further delignificaton processes. The obtained solids from the spent monocarboxylic acid carrier solution were soaked with hot water in a ratio of 10:1 (volume of obtained solids:volume of hot water). After soaking under continuous stirring for 4 h the suspension was filtered. The solid residue contains a high value lignin product.

The filtrate contains dissolved fermentable products in the form of hemicellulose, sugars. To obtain a fermentable solution rich in sugars the filtrate was mixed with solutions (concentrated with reverse osmosis) from the separation optimisation treatment and hydrolysed components from the solid fraction. The solution was fermented with a yeast strain to obtain ethanol which can be used as a product or further fermentation by acetic acid bacteria to form acetic acid that can be used for making a monocarboxylic acid carrier solution or as a product.

Examples 8: Farmer Example Manure Separation Floccculant

A dairy farm operation has an excess of manure that contains minerals and other fertilizer compounds that need to be removed from the slurry pit and deported. It is more desirable to the dairy farm operation to use a liquid for fertilizing meadows with a spraying/injecting system while it is more desirable to transport the solid fraction of manure. However, the liquid fraction still contains more fertilzer compounds than desired (mainly concerning nitrogen and phosphorous) for fertilizing the agricultural land of the dairy farm operation. Therefore, a flocculant is added to the manure storage pitt to precipitate fertilizer compounds in order to move compounds to the solid fraction.

At the farmer iron(III)chloride ($FeCL_3$) is added to the manure storage tank to reach a concentration of 2 g per liter (amount should be tuned desirable for the farming operation) while agitating the tank for 1 hour. After agitation the tank is left to form sediment for 2 days. Then the tank is filtered with a screwpress to separate the liquid from the solid fraction. The liquid fraction now contains 30% less nitrogen and 40% less phosphorous than before flocculation. The solid fraction can now be used for the separation optimisation treatment.

Example 9: Fertilizer

Liquid fractions were processed to create a balanced fertiliser product. The digested solution of the fermentation treatment for the production of acetic acid was filtered. The solid materials were filtered and used as lignocellulose feedstock for use in monocarboxylic acid carrier route. The fermented liquid fraction containing acetic acid was distilled by vacuum distillation to obtain acetic acid for use in the monocarboxylic acid carrier. The solid residue remaining after distillation, high in nutrients originating from manure, was used to create a nutrient rich powder.

To balance this fertiliser product and to retrieve as much nutrients from the original manure as possible. A liquid fraction from the partial filtration and a liquid fraction of the separation treatment was characterised as low in fermentable products but high in nutrients with a total solid content of 67 mg/L. These fractions were concentrated by reverse osmosis to concentration containing 438 mg/L total solids. This concentrated fraction was spray dried to obtain a solid powder that was mixed with the nutrient rich powder obtained from the digested liquid fraction. Composition of the fertilizer was analysed on nutrient composition.

Example 10: Cellulose Diacetate Thermoplast

Manure derived cellulose pulp was treated with the monocarboxylic acid carrier route and acetylated under mild conditions using sulfuric acid $H_2SO_4$ and sodium bisulfate ($NaHSO_4$) in a ratio of 1:3 as catalyst. First cellulose was acetylated to a cellulose triacetate and then hydrolysed to obtain a cellulose diacetate with the desired degree of substitution. A cellulose diacetate with the degree of substitution of 2.08 was obtained and mixed with a plasticiser (e.g. diethyl phthalate (DEP)) to obtain a thermal mouldable material. The product was made into a granulate product.

Example 11: Composite Plastic Using a Polylactic Acid Binding Agent

Manure derived solid fraction with high lignocellulose content and low concentration of proteins and lipids (as e.g. obtained in the separation optimisation treatment of Example 2) is dried at a temperature of 40° C. for a total of 8 hours. The fibres where then mixed in a ratio 1:2 with a polylactic acid binding agent for the duration of 10 minutes at 180° C. The mixture was then pressed into circular plates for the duration of 4 minutes at a temperature of 175° C. After cooling the plates in a similar press at room temperature, tensile strength and impact strength were measured.

Example 12: Regenerated Fibre from Dissolving Grade Pulp

A dissolving grade pulp was obtained through the acetic acid carrier route for manure-based-cellulose (see example 3). 15 grams of dry pulp was broken in smaller pieces and dissolved in 35 ml $H_2O$ together with 50 grams 4-methylmorphiline N-oxide. Excess water was evaporated until the solution formed a spinning dope. The spinning dope was then spun at 100° C. to obtain strands of filament or filament yarn or thread, after which this spun product is immersed in a solution of amine oxide and washed with distilled water. After drying the spun product in open air the spun product may be further processed, like twisted together into cord of rope.

The invention claimed is:

1. A method for producing a manure-derived cellulose acetate at atmospheric pressure, by separating manure into useful components, comprising the steps of:
   a. subjecting the manure to a flocculation treatment, wherein the flocculant optionally comprises of ferric chloride ($FeCl_3$) or aluminium sulfate ($Al_2(SO_4)_3$), and a filtration treatment where fractions having different particle size are separated by using different mesh sizes to obtain solid fractions having a high lignocellulose content;
   b. pulping the manure-derived solid fractions with high lignocellulose content at atmospheric pressure with a monocarboxylic acid carrier solution, wherein the monocarboxylic acid optionally comprises of acetic acid, using a bleaching process comprising of ozone or an peroxyacid to produce a dissolving-grade cellulose pulp;
   c. acetylating the manure-derived dissolving-grade cellulose pulp with acetic anhydride and a catalyst, optionally comprising of sulfuric acid ($H_2SO_4$) and sodium bisulfate ($NaHSO_4$), in the monocarboxylic acid carrier solution to produce cellulose acetate; and
   d. extracting fermentable components from the different fractions of the manure to produce monocarboxylic acids for use in the monocarboxylic acid carrier solution.

2. The process of claim 1 wherein the manure-derived dissolving-grade cellulose pulp is used to produce cellulose based esters or cellulose based ethers.

3. The process of claim 1 wherein the fermentable components are polysaccharides or amino acids that can be used to produce monocarboxylic acids.

4. The process of claim 3 wherein the monocarboxylic acid is acetic acid, formic acid, propionic acid, butyric acid or are a combination thereof.

5. The process of claim 1 wherein the manure-derived solid fraction with high lignocellulose content is delignified, bleached and/or acetylated throughout step b and/or c, either combined or consecutively.

6. The process of claim 5 wherein the monocarboxylic acids are in a concentration of 10-100%.

7. The process of claim 5 wherein nitric acid is added in a concentration of 0-20%.

8. The process of claim 5 wherein sodium bisulphate is added in a concentration of 0-15%.

9. The process of claim 5 wherein organic acid anhydride is added for acetylation of the manure-derived dissolving-grade cellulose pulping product or to decrease the water content of the monocarboxylic acid carrier solution.

10. The process of claim 5 wherein the pulping and acetylation takes place at a temperature of 50-180° C.

11. The process of claim 5 wherein the manure-derived solid fraction with high lignocellulose content is subjected to a base or alkaline extraction treatment prior, during or after the monocarboxylic acid treatment.

12. The process of claim 1 wherein the manure is either partially filtrated or diluted through addition of water to obtain a desired ratio of the treatment while minimizing spent water.

13. The process of claim 12 wherein the separation treatment is repeated under similar conditions with partial or full usage of filtrate retrieved from one or more previous filtration steps.

14. The process of claim 12 wherein the manure is treated with heat, a chelating agent, a detergent, a flocculant, enzymes, an organic solvent, an acid or base.

15. The process of claim 12 wherein the manure is treated with a foaming agent and then agitated, wherein chemical components that build up in the foam can be separated from the suspension by mechanical means.

16. The process of claim 1 wherein any sidestream of the different fractions of the manure is used to produce a fertilizer product that can be used in agricultural, horticultural and consumer embodiments.

17. The process of claim 16 wherein the fertilizer product is made from liquid fractions of manure by removing water or by extracting nutrients using struvite precipitation.

18. A method for producing a fibre of regenerated cellulose derived from manure, by separating manure into useful components, comprising the steps of:
   a. subjecting the manure to a flocculation treatment, wherein the flocculant optionally comprises of ferric chloride ($FeCl_3$) or aluminium sulfate ($Al_2(SO_4)_3$), and a filtration treatment where fractions having different particle size are separated by using different mesh sizes to obtain solid fractions having a high lignocellulose content;

b. pulping the manure-derived solid fractions with high lignocellulose content at atmospheric pressure with a monocarboxylic acid carrier solution, wherein the monocarboxylic acid optionally comprises of acetic acid, using a bleaching process comprising of ozone or an peroxyacid to produce a dissolving-grade cellulose pulp;
c. dissolving manure-derived dissolving-grade cellulose pulp with 4-methylmorphiline N-oxide to form a spinning dope and produce a fibre of regenerated cellulose; and
d. extracting fermentable components from the different fractions of the manure to produce monocarboxylic acids for use in the monocarboxylic acid carrier solution.

* * * * *